United States Patent
Choi et al.

(10) Patent No.: US 8,463,504 B2
(45) Date of Patent: Jun. 11, 2013

(54) ADAPTIVE FRONT LIGHTING SYSTEM FOR PERFORMING HIGHWAY AND URBAN DISTRICT MODES OF FRONT LIGHTING

(75) Inventors: Sung Uk Choi, Hwaseong-si (KR); Hun Soo Kim, Bucheon-si (KR); Hee Jun Jeong, Hwaseong-si (KR); Se Wook Oh, Gunpo-si (KR); Kwang-Seob Kim, Gwacheon-si (KR); Nam-Cheol Hyeong, Yongin-si (KR)

(73) Assignees: Hyundai Motor Company, Seoul (KR); Hyundai Mobis, Seoul (KR)

( * ) Notice: Subject to any disclaimer, the term of this patent is extended or adjusted under 35 U.S.C. 154(b) by 380 days.

(21) Appl. No.: 12/834,612

(22) Filed: Jul. 12, 2010

(65) Prior Publication Data
US 2011/0125373 A1 May 26, 2011

(30) Foreign Application Priority Data
Nov. 25, 2009 (KR) .................. 10-2009-0114406

(51) Int. Cl.
*B60Q 1/00* (2006.01)
(52) U.S. Cl.
USPC .............................. 701/49; 362/465; 382/274
(58) Field of Classification Search
USPC .............................. 701/49; 362/465; 382/274
See application file for complete search history.

(56) References Cited

U.S. PATENT DOCUMENTS

| | | | | |
|---|---|---|---|---|
| 5,499,168 A | * | 3/1996 | Cochard et al. | 362/466 |
| 6,144,159 A | * | 11/2000 | Lopez et al. | 315/82 |
| 6,443,603 B1 | * | 9/2002 | Eberhardt | 362/465 |
| 6,485,168 B2 | * | 11/2002 | Rosenhahn et al. | 362/465 |
| 6,623,147 B2 | * | 9/2003 | Hayami et al. | 362/467 |
| 6,990,397 B2 | * | 1/2006 | Albou et al. | 701/49 |
| 7,936,904 B2 | * | 5/2011 | Furusawa | 382/104 |
| 8,157,427 B2 | * | 4/2012 | Mochizuki et al. | 362/464 |
| 8,200,396 B2 | * | 6/2012 | Morishita et al. | 701/49 |
| 8,242,934 B2 | * | 8/2012 | Kamioka | 340/942 |
| 8,246,227 B2 | * | 8/2012 | Okubo et al. | 362/514 |
| 8,310,662 B2 | * | 11/2012 | Mehr et al. | 356/121 |
| 2002/0039296 A1 | * | 4/2002 | Nishimura et al. | 362/465 |
| 2009/0279316 A1 | * | 11/2009 | Hikmet et al. | 362/465 |

FOREIGN PATENT DOCUMENTS

| | | | |
|---|---|---|---|
| JP | 62293520 A | * | 12/1987 |
| JP | 10254388 A | * | 9/1998 |
| JP | 2003-72458 A | | 3/2003 |
| JP | 2003332627 A | * | 11/2003 |
| JP | 2005-138740 A | | 6/2005 |
| JP | 2009-158205 A | | 7/2009 |
| JP | 2009-208764 A | | 9/2009 |
| JP | 2009248951 A | * | 10/2009 |
| KR | 97-37381 A | | 7/1997 |
| KR | 97-74241 A | | 12/1997 |
| KR | 1998-046864 U | | 9/1998 |

* cited by examiner

*Primary Examiner* — Tuan C. To
(74) *Attorney, Agent, or Firm* — Morgan, Lewis & Bockius LLP

(57) ABSTRACT

An adaptive front lighting system for performing highway and urban district modes of front lights is provided, which includes a leveling actuator rotating a light source of front lights of a vehicle in upward and downward directions, and a control unit judging a driving state of the vehicle as either of a highway driving state and an urban district driving state in accordance with a driving condition of the vehicle and determining a degree of rotation of the light source performed by the leveling actuator in accordance with a result of judgment. The driving condition includes at least one of a vehicle speed, external illumination, and frequency of vehicle stops.

16 Claims, 5 Drawing Sheets

ADAPTIVE FRONT LIGHTING SYSTEM FOR PERFORMING HIGHWAY AND URBAN DISTRICT MODES OF FRONT LIGHTING

CROSS-REFERENCE TO RELATED APPLICATION

The present application claims priority to Korean Patent Application No. 10-2009-0114406, filed on Nov. 25, 2009, the entire contents of which is incorporated herein for all purposes by this reference.

BACKGROUND OF THE INVENTION

1. Field of the Invention

The present invention relates to an adaptive front lighting system for performing highway and urban district modes of front lights, and more particularly, to an adaptive front lighting system for performing highway and urban district modes of front lights, which can provide best optimized beam patterns when a vehicle travels at highway or in urban districts.

2. Description of Related Art

Typically, an adaptive front lighting system (AFLS) corresponds to technology that can increase the safety during night driving of a vehicle by changing the width or length of light emitted from vehicle front lights in accordance with the driving environment, e.g. the road state or weather state, and recently, the development thereof has been made quite actively.

A related art structure for performing such an adaptive front lighting system will be described with reference to FIG. 5. As illustrated in FIG. 5, a conventional adaptive front lighting system includes an actuator 10 for changing beam patterns, a rotary shaft rotating by the actuator 10 for changing the beam patterns, a shield provided on the rotating shaft to realize various shapes in accordance with the rotation of the rotary shaft, an actuator 20 for driving left and right front lights, and an actuator 30 for driving upper and lower front lights. Through the above-described configuration, the related art adaptive front lighting system forms necessary beam patterns according to the driving environment of the vehicle by changing the shape of the shield according to the rotation of the rotary shaft.

Another related art structure which is provided with a plurality of LED light sources capable of forming diverse beam patterns according to the driving environment of a vehicle, and forms necessary beam patterns by selectively using necessary LED light sources has been disclosed.

However, the above-described related art structures have problems that a separate driving device (e.g. an actuator for changing beam patterns) or a plurality of LED light sources are required to realize necessary beam patterns, and thus its structure is complicated with high manufacturing cost. Also, the related art structure as described above with reference to FIG. 5 has drawbacks that the quantity of light emitted from the same light source is limited in securing visual recognition over long distance. Also, since a general motor or a solenoid has been used to configure the actuator for changing the beam patterns, noise may occur during an operation thereof, and the endurance deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an adaptive front lighting system, which can provide best optimized beam patterns in accordance with the driving environment of a vehicle even with a simple structure.

In an aspect of the present invention, an adaptive front lighting system for performing highway and urban district modes of front lights, may include a driving device rotating at least a light source of the front lights of a vehicle in upward and downward directions, and a control unit judging a driving state of the vehicle as either of a highway driving state and an urban district driving state in accordance with a driving condition of the vehicle and determining a degree of rotation of the at least a light source performed by the driving device in accordance with a result of judgment, wherein the driving condition includes at least one of a vehicle speed, external illumination, and frequency of vehicle stops.

The driving device may include a support bar connecting the at least a light source and pivotally coupled to vehicle, and a leveling actuator pivotally coupled to an end portion of the support bar to move the support bar in forward and rearward directions and thus rotate the at least a light source in the upward and downward directions.

The control unit may control the driving device to rotate the at least a light source to a beam plan being lower than a horizontal plane with a predetermined angle in a normal state, to rotate the at least a light source to a first position higher than the beam plane with a first predetermined angle in the highway driving state, and to rotate the at least a light source to a second position lower than the beam plan with a second predetermined angle in the urban district driving state, wherein the first and second predetermined angles are smaller than the predetermined angle, and wherein the predetermined angle is approximately 0.57°, the first predetermined angle is approximately 0.25° and the second predetermined angle is approximately 0.25°.

If the vehicle speed is higher than a first speed for a predetermined time period, the control unit may judge that the current driving state of the vehicle is the highway driving state and heightens the degree of rotation of the at least a light source by the first predetermined angle from the beam plan, wherein the first speed is approximately 100 km/h, and the predetermined time period is approximately 5 minutes If the vehicle speed is lower than a first speed, the control unit may judge that the current driving state of the vehicle is the urban district driving state and lowers the degree of rotation of the at least a light source by the second predetermined angle from the beam plan, If the vehicle speed is lower than the first speed for a predetermined time period, the control unit may judge that the current driving state of the vehicle is the urban district driving state and lowers the degree of rotation of the at least a light source by the second predetermined angle from the beam plan.

If the frequency of the vehicle stops is lower than a predetermined amount for a predetermined time period, the control unit may judge that the current driving state of the vehicle is the highway driving state and heightens the degree of rotation of the at least a light source by the first predetermined angle from the beam plane, wherein the frequency of the vehicle stops is determined by counting the number of the vehicle stops and the vehicle speed is assumed as the vehicle stop when the vehicle speed is under a predetermined speed.

If the frequency of the vehicle stops is higher than a predetermined amount for a predetermined time period, the control unit may judge that the current driving state of the vehicle is the urban district driving state and lowers the degree of rotation of the at least a light source by the second predetermined angle from the beam plane.

If the luminosity of the external illumination is lower than a predetermined amount for a predetermined time period, the control unit may judge that the current driving state of the vehicle is the highway driving state and heightens the degree of rotation of the at least a light source by the first predetermined angle from a beam plane.

If the luminosity of the external illumination is higher than a predetermined amount for a predetermined time period, the control unit may judge that the current driving state of the vehicle is the urban district driving state and lowers the degree of rotation of the at least a light source by the second predetermined angle from the beam plane.

If the control unit judges that the driving state of the vehicle is the urban district driving state according to the vehicle speed, the external illumination and the frequency of vehicle stops, the control unit may lower the degree of rotation of the at least a light source by the second predetermined angle from the beam plane to improve the safety during urban district driving of the vehicle.

If the control unit judges that the driving state of the vehicle is the highway driving state, the control unit may increase an amount of current applied to the at least a light source so as to increase the quantity of light from the at least a light source.

If the control unit judges that the driving state of the vehicle is the urban district driving state, the control unit may decrease the amount of current applied to the at least a light source so as to decrease the quantity of light from the light source.

With the above-described construction, since the adaptive front lighting system according to an embodiment of the present invention can change the illumination angle and the brightness of the light source in accordance with the driving environment of the vehicle, even with a simple structure, the best optimized beam patterns can be provided depending upon whether the vehicle travels at highway or in urban districts.

Also, since the adaptive front lighting system according to an embodiment of the present invention can control the rotating angle of the light source and the amount of current flowing to the light source only with the leveling actuator and the control unit, the manufacturing cost can be reduced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
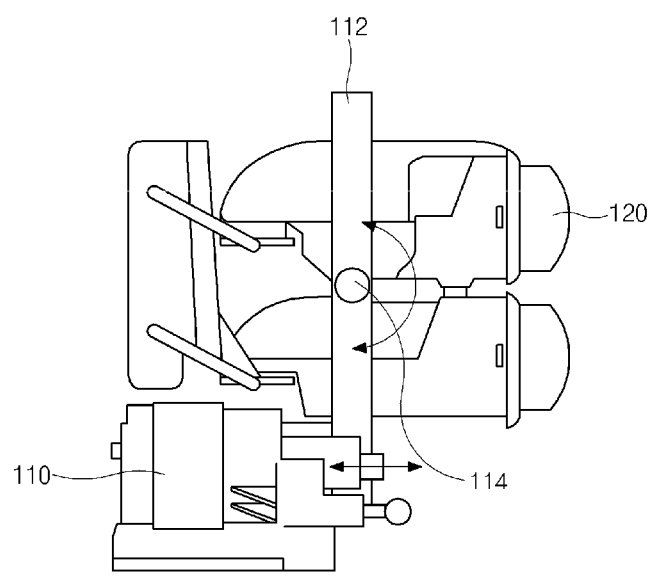
FIG. 1 is a side view illustrating an exemplary adaptive front lighting system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
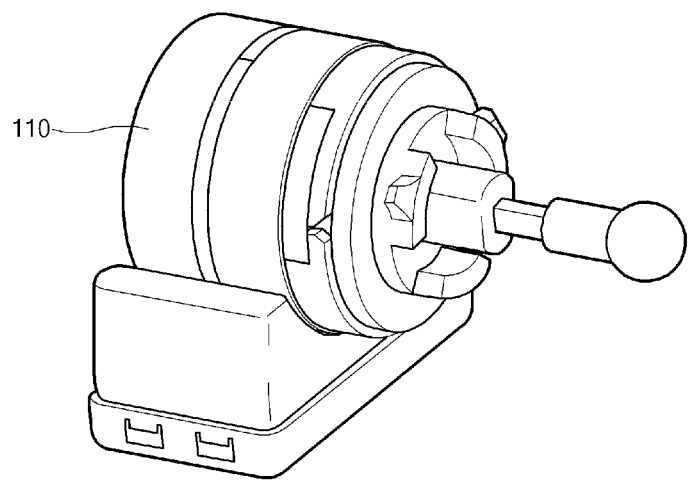
FIG. 2 is a perspective view illustrating a leveling actuator as shown in FIG. 1.
Figure 3:
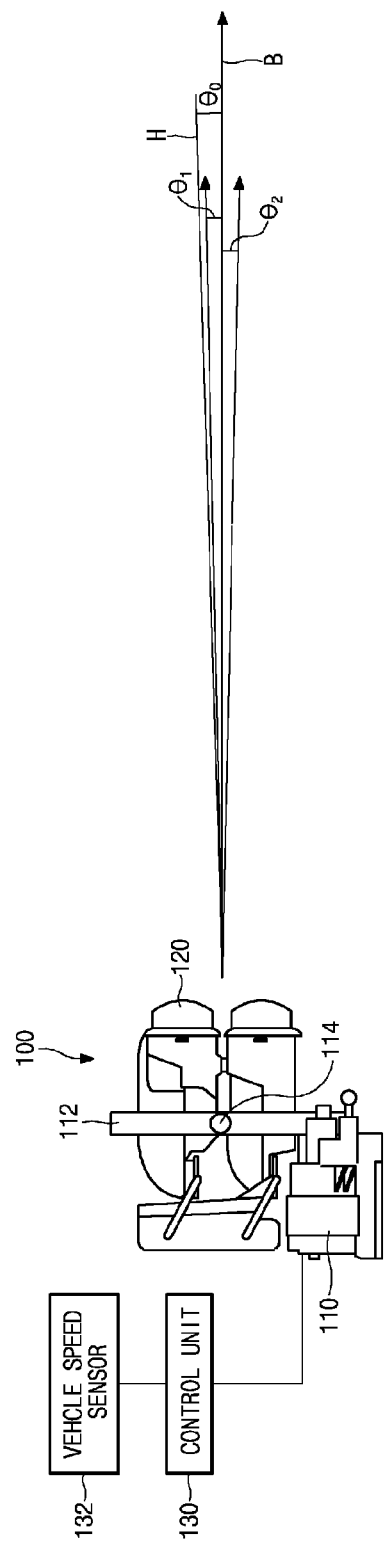
FIG. 3 is a conceptual view explaining an operation state of the exemplary adaptive front lighting system as shown in FIG. 1.

FIG. 1 is a side view illustrating an adaptive front lighting system according to an exemplary embodiment of the present invention. FIG. 2 is a perspective view illustrating a leveling actuator as shown in FIG. 1, and FIG. 3 is a conceptual view explaining an operation state of the adaptive front lighting system as shown in FIG. 1. As shown in FIGS. 1 to 3, an adaptive front lighting system 100 according to an exemplary embodiment of the present invention includes a leveling actuator 110 and a control unit 130.

Typically, the adaptive front lighting system (AFLS) includes a driving device that rotates light sources of front lights of a vehicle in upward and downward directions and a driving device that rotates the light source in left and right directions. Through these driving devices, the adaptive front lighting system can change the illumination angle of the front lights of the vehicle in accordance with the driving environment of the vehicle, and thus can sufficiently secure the visual recognition of a driver during night driving to improve the safety during driving of the vehicle.

The adaptive front lighting system 100 according to an exemplary embodiment of the present invention includes the leveling actuator 110 that rotates the light sources 120 of the front lights of the vehicle in upward and downward directions. The leveling actuator 110 is connected to a lower end of a support bar 112 that supports the light sources 120 of the front lights, and moves the lower end of the support bar 112 in forward and backward directions. According to this movement, the support bar 112 is rotated around the shaft of a rotating hinge 114, and thus the light sources 120 is also rotated in upward and downward directions.

It is preferable that the leveling actuator 110 is an intelligent stepping motor. In the case of using a general motor or a solenoid to rotate the light sources of the front lights of the vehicle, like the adaptive front lighting system of the related art, noise may occur due to the operation of the motor or solenoid, and the endurance thereof may deteriorate. Also, the space utility of the inside of the front lights may be lowered.

It is also preferable that the light source 120 is an LED (Light Emitting Diode). The LED is operable with small power and has high illumination, so that the light efficiency of the LED is superior to that of a light bulb. Also, the LED has a small size in comparison to the light bulb to heighten the degree of freedom in designing the front light, and has a long lifespan.

The leveling actuator 110 is controlled by the control unit 130. More specifically, the control unit 130 judges the driving state of the vehicle as either of a highway driving state and an urban district driving state in accordance with the driving condition of the vehicle, and determines the degree of rotation of the light source 120 performed by the leveling actuator 110 in accordance with a result of judgment. The driving condition of the vehicle, which is the basis of judgment of the driving environment of the vehicle through the control unit 130, may be at least one of a vehicle speed, external illumination, and frequency of vehicle stops.

For example, if the vehicle speed is higher than a first speed and a duration time for maintaining the first speed exceeds a predetermined time period, the control unit 130 judges that the current driving state of the vehicle is the highway driving state. More specifically, if the vehicle speed exceeds 100 km/h and this speed is maintained over 5 minutes, the control unit 130 judges that the current driving state is the highway driving state.

In contrast, the control unit 130 can judge that the current driving state is the urban district driving state on the basis of the vehicle speed, the external illumination, and the frequency of vehicle stops. More specifically, if the vehicle speed is below 60 km/h, the control unit 130 judges that the current driving state is the urban district driving state. In another exemplary embodiment of the present invention, if the vehicle speed is below 60 km/h for a predetermined time period, the control unit 130 may judge that the current driving state is the urban district driving state.

The vehicle speed may be measured by a vehicle speed sensor 132 generally used in a vehicle, and the external illumination of the vehicle may be measured by an illumination sensor (not illustrated) generally used in a vehicle. The measured data is transferred to the control unit 130, and the control unit 130 controls the leveling actuator 110 based on the data.

The frequency of vehicle stops is determined by counting the number of vehicle stops under the assumption that a case in which the vehicle speed is below a predetermined speed (i.e. a speed almost near to zero) corresponds to the vehicle stop.

In an exemplary embodiment of the present invention, if the frequency of the vehicle stops is lower than a predetermined amount for a predetermined time period, the control unit may judge that the current driving state of the vehicle is the highway driving state and heightens an angle of the light source to a predetermined angle from a beam plan B as explained later.

Instead, if the frequency of the vehicle stops is higher than a predetermined amount for a predetermined time period, the control unit judges that the current driving state of the vehicle is the urban district driving state and lowers an angle of the light source to a predetermined angle from the beam plan B.

In an exemplary embodiment of the present invention, if the luminosity of the external illumination is lower than a predetermined amount for a predetermined time period, the control unit judges that the current driving state of the vehicle is the highway driving state and heightens an angle of the light source to a predetermined angle from the beam plan B.

In contrast, if the luminosity of the external illumination is higher than a predetermined amount for a predetermined time period, the control unit judges that the current driving state of the vehicle is the urban district driving state and lowers an angle of the light source to a predetermined angle from the beam plan.

The control unit 130 can adjust the quantity of light from the light source 120 by adjusting the amount of current applied to the light source 120. That is, if greater light quantity is required (i.e. if higher brightness is required), the control unit 130 increases the amount of current applied to the light source 120, while if less light quantity is required, the control unit 130 decreases the amount of current applied to the light source 120. For reference, the control unit 130 may be an ECU (Electronic Control Unit) of the vehicle.

The operation of the adaptive front lighting system 100 as configured above according to an exemplary embodiment of the present invention will be described with reference to FIG. 3.

If it is judged that the driving state of the vehicle is the highway driving state according to the driving condition of the vehicle, the control unit 130 heightens the angle of the light source 120 by 0.25° ($\theta_1$) from the beam plan B through the leveling actuator 110. Also, the control unit 130 may increase the amount of current applied to the light source 120 by 20% to increase the quantity of light from the light source 120.

Typically, the driving at highway is performed at high speed. Accordingly, in the case of night driving at highway, it is required to secure a long-distance visual field for safety in driving. As a result, since the long-distance visual field is secured by heightening the angle of the light source 120 to a predetermined angle and by increasing the amount of current flowing into the light source 120, the vehicle driving can be performed more safely even though the vehicle is driven at high speed at highway during the night time.

For reference, in a normal state, the angle of the light source 120 of the front lights is lowered by 0.57° ($\theta_0$) from the horizontal plane (H) to the beam plan "B" in FIG. 3.

In contrast, if it is judged that the driving state of the vehicle is the urban district driving state according to the driving condition of the vehicle, the control unit 130 lowers the angle of the light source 120 by 0.25° ($\theta_2$) from the beam plan B through the leveling actuator 110. Also, the control unit 130 may decrease the amount of current applied to the light source 120 by 30% to decrease the quantity of light from the light source 120.

Typically, in the case of driving in urban districts, it is important to secure the visual field in the neighborhood of the vehicle rather than to secure the long-distance visual field. Accordingly, it is preferable for the light source 120 of the front light to illuminate at wide angle rather than to illuminate for long distance. Also, if the angle of the light source of the front light is too high, it may disturb the visual field of another vehicle driver in an opposite lane, and thus it is preferable to lower the angle of the light source 120 of the front light in urban districts where there are a large number of traveling vehicles. As a result, by lowering the angle of the light source by a predetermined angle and decreasing the amount of current flowing into the light source 120, the visual field against the neighborhood of the vehicle is prominently secured, and the visual field of another vehicle driver in an opposite lane is not disturbed to secure the safety during the urban district driving.

Figure 4:
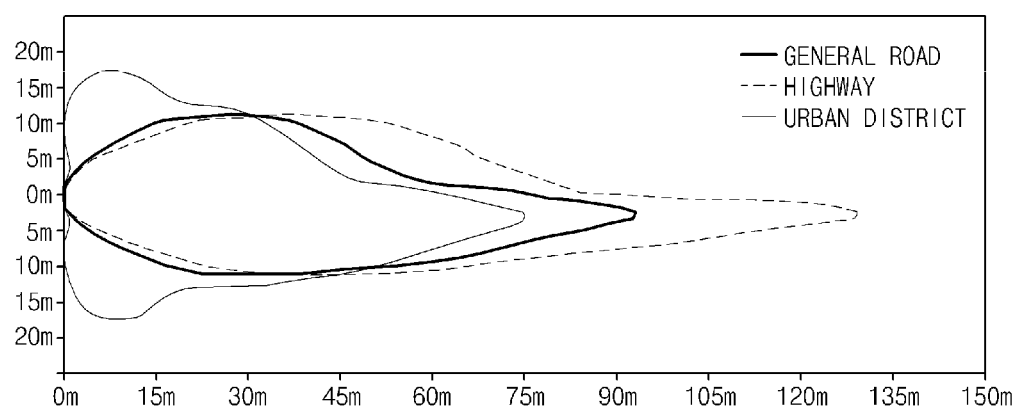
FIG. 4 is a graph explaining beam patterns on a road surface provided by the exemplary adaptive front lighting system according to the present invention.
Figure 5:
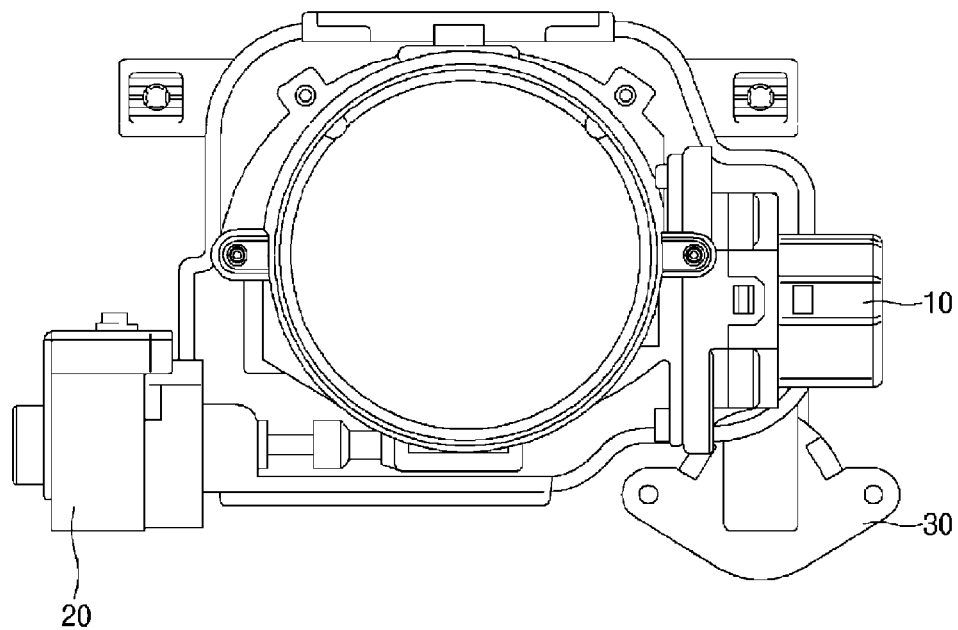
FIG. 5 is a front view illustrating an adaptive front lighting system of the related art.

Road-surface beam patterns made by the adaptive front lighting system 100 according to an exemplary embodiment of the present invention will now be described with reference to FIG. 4. FIG. 4 is a graph explaining beam patterns on a road surface provided by the adaptive front lighting system according to an exemplary embodiment of the present invention. As illustrated in FIG. 4, it can be confirmed that the adaptive front lighting system according to an exemplary embodiment of the present invention illuminates light beams for a long distance during highway driving as described above. Also, it can be confirmed that the adaptive front lighting system according to an exemplary embodiment of the present invention illuminates light beams at wide angle in the neighborhood of the vehicle as described above. These features as illustrated in FIG. 4 are summarized as in a table below.

| Classification | General Road | Highway | Urban District |
|---|---|---|---|
| Center (m) | 70 | 80 | 62 |
| Beam Width (m) | 24 | 24 | 35 |
| Long Distance (m) | 95 | 130 | 75 |

As a result, the adaptive front lighting system according to an exemplary embodiment of the present invention can provide best optimized beam patterns depending upon whether the vehicle travels at highway or in urban districts. Also, since the adaptive front lighting system according to an exemplary embodiment of the present invention can control the rotating angle of the light source and the amount of current flowing to the light source only with the leveling actuator and the control unit, it is not required to additionally adopt a separate device or to change the shield shape of the front lights in order to provide the optimized beam patterns, and thus the manufacturing cost can be reduced.

For convenience in explanation and accurate definition in the appended claims, the terms "upwards" or "downwards", "left", or "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An adaptive front lighting system for performing highway and urban district modes of front lights, comprising:
   a driving device rotating at least a light source of the front lights of a vehicle in upward and downward directions; and
   a control unit judging a driving state of the vehicle as either of a highway driving state and an urban district driving state in accordance with a driving condition of the vehicle and determining a degree of rotation of the at least a light source performed by the driving device in accordance with a result of judgment,
   wherein the driving condition includes at least one of a vehicle speed, external illumination, and frequency of vehicle stops, and
   wherein the driving device includes:
      a support bar connecting the at least a light source and pivotally coupled to vehicle; and
      a leveling actuator pivotally coupled to an end portion of the support bar to move the support bar in forward and rearward directions and thus rotate the at least a light source in the upward and downward directions.

2. The adaptive front lighting system of claim 1, wherein the control unit controls the driving device to rotate the at least a light source to a beam plan being lower than a horizontal plane with a predetermined angle in a normal state, to rotate the at least a light source to a first position higher than the beam plane with a first predetermined angle in the highway driving state, and to rotate the at least a light source to a second position lower than the beam plan with a second predetermined angle in the urban district driving state.

3. The adaptive front lighting system of claim 2, wherein the first and second predetermined angles are smaller than the predetermined angle.

4. The adaptive front lighting system of claim 3, wherein the predetermined angle is approximately 0.57°, the first predetermined angle is approximately 0.25° and the second predetermined angle is approximately 0.25°.

5. The adaptive front lighting system of claim 2, wherein if the vehicle speed is higher than a first speed for a predetermined time period, the control unit judges that the current driving state of the vehicle is the highway driving state and heightens the degree of rotation of the at least a light source by the first predetermined angle from the beam plan.

6. The adaptive front lighting system of claim 5, wherein the first speed is approximately 100 km/h, and the predetermined time period is approximately 5 minutes.

7. The adaptive front lighting system of claim 2, wherein if the vehicle speed is lower than a first speed, the control unit judges that the current driving state of the vehicle is the urban district driving state and lowers the degree of rotation of the at least a light source by the second predetermined angle from the beam plan.

8. The adaptive front lighting system of claim 2, wherein if the vehicle speed is lower than a first speed for a predetermined time period, the control unit judges that the current driving state of the vehicle is the urban district driving state and lowers the degree of rotation of the at least a light source by the second predetermined angle from the beam plan.

9. The adaptive front lighting system of claim 2, wherein if the frequency of the vehicle stops is lower than a predetermined amount for a predetermined time period, the control unit judges that the current driving state of the vehicle is the highway driving state and heightens the degree of rotation of the at least a light source by the first predetermined angle from the beam plane.

10. The adaptive front lighting system of claim 9, wherein the frequency of the vehicle stops is determined by counting the number of the vehicle stops and the vehicle speed is assumed as the vehicle stop when the vehicle speed is under a predetermined speed.

11. The adaptive front lighting system of claim 2, wherein if the frequency of the vehicle stops is higher than a predetermined amount for a predetermined time period, the control unit judges that the current driving state of the vehicle is the urban district driving state and lowers the degree of rotation of the at least a light source by the second predetermined angle from the beam plane.

12. The adaptive front lighting system of claim 2, wherein if the luminosity of the external illumination is lower than a predetermined amount for a predetermined time period, the control unit judges that the current driving state of the vehicle is the highway driving state and heightens the degree of rotation of the at least a light source by the first predetermined angle from a beam plane.

13. The adaptive front lighting system of claim 2, wherein if the luminosity of the external illumination is higher than a predetermined amount for a predetermined time period, the control unit judges that the current driving state of the vehicle is the urban district driving state and lowers the degree of rotation of the at least a light source by the second predetermined angle from the beam plane.

14. The adaptive front lighting system of claim 2, wherein if the control unit judges that the driving state of the vehicle is the urban district driving state according to the vehicle speed, the external illumination and the frequency of vehicle stops, the control unit lowers the degree of rotation of the at least a light source by the second predetermined angle from the beam plane to improve the safety during urban district driving of the vehicle.

15. The adaptive front lighting system of claim 2, wherein if the control unit judges that the driving state of the vehicle is the highway driving state, the control unit increases an amount of current applied to the at least a light source so as to increase the quantity of light from the at least a light source.

16. The adaptive front lighting system of claim 2, wherein if the control unit judges that the driving state of the vehicle is the urban district driving state, the control unit decreases the amount of current applied to the at least a light source so as to decrease the quantity of light from the light source.

* * * * *